United States Patent

[11] 3,550,632

| [72] | Inventors | Thomas E. Noakes<br>Detroit;<br>James A. Kozel, Franklin, Mich. |
|---|---|---|
| [21] | Appl. No. | 745,305 |
| [22] | Filed | July 16, 1968 |
| [45] | Patented | Dec. 29, 1970 |
| [73] | Assignee | American Standard Inc.<br>New York, N.Y.<br>a corporation of Delaware |

[54] THREE WAY SOLENOID VALVE
3 Claims, 4 Drawing Figs.

[52] U.S. Cl. .................................................. 137/625.65,
                                                251/139, 251/141
[51] Int. Cl. ........................................................ F16k 31/06
[50] Field of Search ............................................ 251/139,
                                                141; 137/625.65

[56] References Cited
UNITED STATES PATENTS

| 3,043,336 | 7/1962 | Parent et al. ................ | 251/139X |
| 3,080,889 | 3/1963 | Noakes ......................... | 137/625.65 |
| 3,412,970 | 11/1968 | Robarge ....................... | 251/139X |
| 3,420,260 | 1/1969 | Wisniewski ................... | 251/139X |

*Primary Examiner*—Arnold Rosenthal
*Attorneys*—John E. McRae, Tennes I. Erstad and Robert G. Crooks ABSTRACT: A three-way solenoid valve having a valve body formed by two molded plastic body elements clamped together by C-shaped spring clips. These body elements are configured to define three spigots adapted to receive fluid hoses, one of said spigots also acting as a guide tube for a valve element armature and a locating means for a solenoid winding. A principal feature of the arrangement is parts miniaturization with accompanying cost reduction.

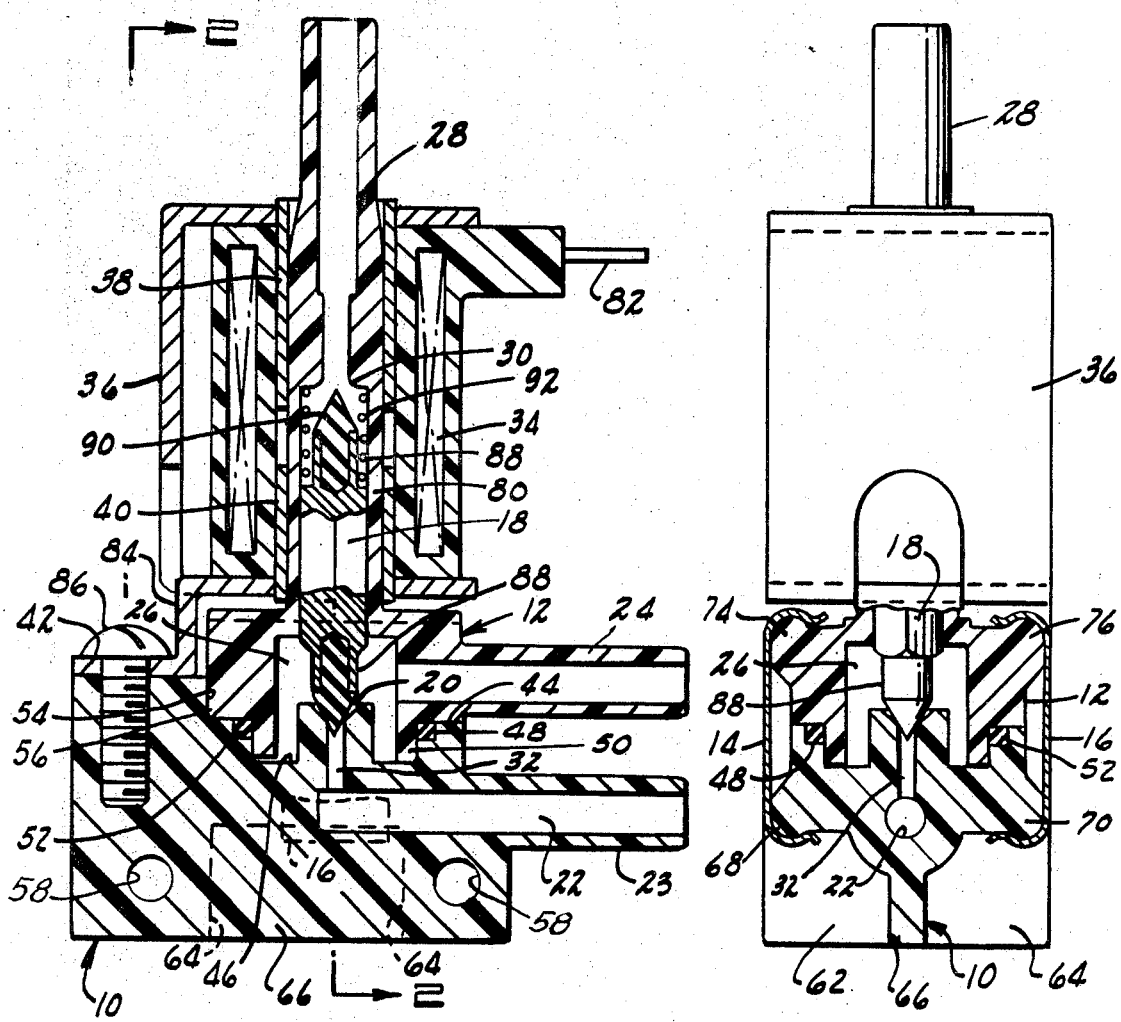
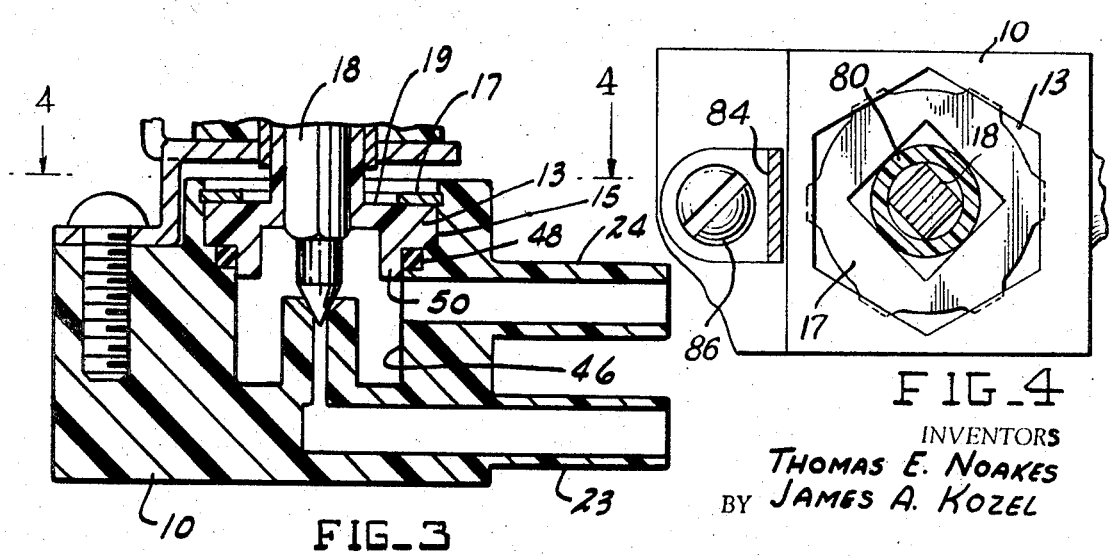

THREE WAY SOLENOID VALVE

THE DRAWINGS

FIG. 1 shows a solenoid valve of the invention in longitudinal section.

FIG. 2 is a section taken on line 2–2 in FIG. 1.

FIG. 3 shows a section through part of another valve embodying the invention.

FIG. 4 is a sectional view on lines 4–4 in FIG. 3.

GENERAL ARRANGEMENT

As shown in FIG. 1 the solenoid valve comprises a primary valve body element 10 formed as a plastic molded part, and a secondary valve body element 12 also formed as a plastic molded part. Elements 10 and 12 are clamped together by two spring clips 14 and 16; an armature plunger 18 is inserted into the interior of the valve body before the valve body elements are clamped together. The clamped assembly is provided with three spigots, numbered 23, 24 and 28; each is intended to be connected to a plastic hose for operative connection into a fluid system. Spigot 24 constitutes a supply spigot and the other two spigots constitute alternate discharge spigots. In its illustrated position armature 18 closes against a first valve seat 20, thereby preventing any flow of fluid from supply spigot 24 through the passage 22 defined by exhaust spigot 23. Armature 18 is of a different cross-sectional shape than the confining valve body passage; for example the confining passage may be circular and the armature square or hexagonal. Fluid is thereby able to pass from supply spigot 24 into the cylindrical chamber 26, up along the side surfaces of the armature, and thence through discharge spigot 28.

The armature can be moved upwardly to close against a second valve seat 30, thereby causing supply fluid at spigot 24 to be diverted into a passage 32 and thence through spigot 23. Upward movement of the armature is effected by a solenoid winding 34, which when energized, produces magnetic flux in a circuit defined by U-frame 36 and two spaced sleeves 38 and 40. Thus, when winding 34 is energized the armature is drawn up in an effort to magnetically bridge the space between sleeves 38 and 40. As it does so it closes seat 30 and opens seat 20.

THE VALVE BODY

Primary valve body element 10 is provided with a stepped upper face which includes a first raised surface 42 and a second lower surface 44. Hollowed out of surface 44 is a circular cavity 46 and a surrounding circular recess 48. Cavity 46 snugly receives the depending cylindrical boss portion 50 of the secondary valve body element 12, and recess 48 receives an annular elastomeric sealing element 52. To prevent relative rotation of valve body 12 about the axis of boss 50 the mating vertical surfaces 54 and 56 of the valve body elements are formed flat or at least nonconcentric with respect to the boss 50 axis.

As shown in FIG. 1, the primary valve body element is formed with transverse holes 58 adapted to receive bolts, screws, rivets, etc. for attaching the valve body to a suitable mounting structure, not shown. These holes go through thickened sections of the valve body adjacent its opposite ends. FIG. 2 is taken approximately through the midpoint of the valve body, and at this point the body is recessed or cut away along its undersurface. These recesses, designated by numerals 62 and 64 do not extend through the entire width of the body but instead terminate short of one another to define a downwardly extending rib 66 which serves to strengthen the body against cracking or deformation.

The recesses 62 and 64 define cylinderlike projections 68 and 70 on the primary valve body element. Additional projections 74 and 76 are formed on the secondary valve body element 12. After the two elements 10 and 12 have been assembled together spring clips 14 and 16 can be manually forced or snapped over the cylinderlike projections to prevent vertical separation of the two body elements. As previously noted, the flat surfaces 54 and 56 prevent relative turning of the two valve body elements. Therefore clips 14 and 16 are exposed only to tension forces. They are not subject to twist forces and can be of relatively light gage strip material so as to be rather easily snapped into place during valve assembly. As seen in FIG. 2, the clips are located on the external outer side surfaces of the valve body rather than extending through the body. The body can thus be relatively narrow in the arrow 75 direction since no body material is required for screws or other internal fasteners. This economizes on plastic and reduces the body width for easier utilization of the valve in small clearance spaces. An actual valve body might have a width of about one inch in the arrow 75 direction.

It will be seen from FIG. 1 that the secondary valve body element 12 includes an upwardly extending tubular section 80 having an internal shoulder 30 defining a valve seat, and having a spigotlike extension 28 adapted to receive a fluid hose, not shown. The internal and external surfaces of tubular section 80 are preferably circular in cross section to appropriately accommodate armature 18 and ferromagnetic sleeves 38 and 40. All three spigots 28, 24 and 23 are generally in the same vertical plane (plane of the paper in FIG. 1). Thus the spigots do not increase the arrow 75 width of the valve. As a result, the valve can be located in fairly narrow spaces on the order of 1 inch or thereabouts.

SOLENOID STRUCTURE

Solenoid 34 is a miniature solenoid comprising a plastic spool encapsulated within a plastic sheathing as shown for example in U.S. Pat. No. 3,263,959. Suitable spade-type terminals 82 are inserted in slots in an end wall of the spool and connected to the windings, after which the sheathing is provided, as by injection molding around the wound spool.

The solenoid coil is disposed within frame 36, and sleeves 38 and 40 are thereafter inserted into the winding so as to have firm contact with the frame surfaces, thereby providing the magnetic circuit. As best shown in FIG. 1 the coil frame is provided with a tab 84 which extends downwardly and then laterally. The coil, comprising frame 36 and sleeves 38 and 40, can be slipped loosely onto tubular section 80, and a screw 86 threaded through tab 84 into a preformed hole in valve body element 10 to retain the coil on the valve body. It will be seen that the coil is retained in place both by its fit on tubular section 80 and by screw 86. A single screw is sufficient since the screw is merely a holddown and antirotation device. FIG. 2 shows the width of frame 36 as corresponding generally with the width of the valve body. Thus the single screw construction permits use of a coil with a sufficient number of turns without unduly increasing the width of the assembly.

Armature 18 comprises a ferromagnetic plunger having a square cross section throughout the major portion of its length. However, the end portions 88 of the plunger have hollow cylindrical cross sections for connection with rubber tip elements 90, said tip elements having conical exposed ends for good sealing engagement with the respective valve seats 20 and 30. Preferably the rubber tips are formed by molding them into the armature. A compression spring 92 may be provided to move the armature to its illustrated position when coil 34 is deenergized.

FIGURE 3

The construction of FIG. 3 is similar to FIG. 1 except that spigot 24 is formed integrally with the main valve body element instead of the secondary valve body element. The secondary body element comprises a main body portion 13 having a depending boss 50 received within cavity 46. As in the case of the FIG. 1 embodiment, a sealing ring 48 is provided to seal the joint between the two valve body elements. Portion 13 of the secondary element can have a hexagonal or other noncircular cross section for seating within a mating recess 15 in the main valve element body, thereby preventing any rotation of the secondary element. Any tendency of the secondary element to be displaced upwardly can be prevented by a retainer 17 suitably secured or otherwise anchored to the main valve body element. For example, the retainer can have peripheral projections or teeth which mate with vertical recesses in the primary element 10. The retainer can therefore be dropped onto the upper face 19 of element 13 and rotated a slight distance to cause the teeth to dig into element 10, thus locking element 13 in place.

The remaining structure, including armature 18, spigot 28, coil 34 and magnetic frame 36, are preferably constructed as shown in FIG. 1. Element 17 takes the place of the spring clips 14 and 16.

Primary features of the invention are parts miniaturization and simplification for cost reduction and better utilization of the valve in small spaces.

We claim:

1. A solenoid valve comprising a valve body which includes a primary valve body element 10 formed as a one piece molding; said element having a cavity 46 in one face thereof, the bottom surface of said cavity having an opening therein defining a first valve seat 20; said body element having an integral tubular extension 23 defining a hollow spigot, and a flow passage 32 between the spigot and the valve seat opening; a secondary body element 12 formed as a one piece molding; said secondary element having a boss portion 50 seating within the cavity, and a tubular section 80 projecting axially away from the aforementioned valve seat; said tubular section having an internal shoulder 30 defining a second valve seat axially aligned with the first valve seat; an armature plunger 18 floatably disposed within the tubular section for movement between the valve seats; a solenoid telescoped onto the tubular section for moving the armature toward the second valve seat when energized; said solenoid comprising a solenoid winding and an encircling magnetic flux frame 36; said frame comprising a U-shaped member having its web arranged parallel to the aforementioned armature and its end flanges encircling the ends of the winding; means for mounting the frame on the main valve body element comprising a fastener tab 84 struck out of the frame, and a fastener element 86 extending through the tab into the primary valve body element; the aforementioned tubular section 80 extending an appreciable distance beyond the solenoid to form a second hollow spigot 28; means forming a third hollow spigot 24 integral with one of said primary body element and the base portion of the secondary body element; and a second flow passage between the third spigot and the aforementioned cavity; the arrangement causing the third spigot to communicate with the second spigot when the armature is closed against the first valve seat, and the third spigot to communicate with the first spigot when the armature is closed against the second valve seat; the three spigots and fastener tab 84 being substantially in the same plane, whereby to minimize the width of the valve in the direction transverse to said plane.

2. The valve of claim 1 wherein the third spigot is formed integrally with the base portion of the secondary body element; the combination further comprising special means for locking the two valve body elements together; said locking means comprising external projections on the base portion of the secondary element, other external projections on the valve body element, and two C-shaped spring clips snapped over the projections to exert clamping forces on the two elements.

3. The valve of claim 1 and further comprising special means for mounting the valve; said mounting means comprising holes extending directly through the primary valve body element adjacent its opposite ends; said holes being parallel to one another and normal to the armature axis.